US011582095B2

United States Patent
Lo et al.

(10) Patent No.: US 11,582,095 B2
(45) Date of Patent: Feb. 14, 2023

(54) SYSTEMS AND METHODS FOR CONVERGENCE OF NETWORK TRAFFIC AFTER AN INTERRUPTION OF A NETWORK DEVICE'S LINK

(71) Applicant: Arista Networks, Inc., Santa Clara, CA (US)

(72) Inventors: Alton Lo, Fremont, CA (US); Rajesh Semwal, Sunnyvale, CA (US); Isidoros Kouvelas, Strovolos (CY); Amit Ranpise, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/108,405

(22) Filed: Dec. 1, 2020

(65) Prior Publication Data

US 2022/0103425 A1 Mar. 31, 2022

(51) Int. Cl.
*H04L 41/0813* (2022.01)
*H04L 12/46* (2006.01)
*H04L 45/00* (2022.01)
*H04L 45/28* (2022.01)
*H04L 45/02* (2022.01)

(52) U.S. Cl.
CPC ...... *H04L 41/0813* (2013.01); *H04L 12/4641* (2013.01); *H04L 12/4679* (2013.01); *H04L 45/22* (2013.01); *H04L 45/28* (2013.01); *H04L 45/02* (2013.01)

(58) Field of Classification Search
USPC .......................................... 370/254
See application file for complete search history.

(56) References Cited

U.S. PATENT DOCUMENTS

| | | | | |
|---|---|---|---|---|
| 2016/0134528 A1* | 5/2016 | Lin | ......................... | H04L 45/66 709/238 |
| 2017/0195199 A1* | 7/2017 | Dorai | .................. | H04L 12/4641 |
| 2018/0006995 A1* | 1/2018 | Bickhart | ................. | H04L 45/66 |
| 2018/0183654 A1* | 6/2018 | Patel | .................... | H04L 41/0686 |
| 2018/0248803 A1* | 8/2018 | Nagarajan | ............... | H04L 12/46 |

* cited by examiner

*Primary Examiner* — Kwang B Yao
*Assistant Examiner* — Xuan Lu
(74) *Attorney, Agent, or Firm* — Fountainhead Law Group PC

(57) ABSTRACT

Systems and methods are provided herein for a mechanism for faster convergence of network traffic after a network device's link is interrupted by leveraging the withdrawal of the ethernet virtual private network (EVPN) auto discovery (AD) route. This may be accomplished by a first device checking an ethernet segment identifier (ESI) status flag before generating an entry in the first device's forwarding table, where the entry is based on an IP route for a host received by a second network device. In response to receiving a withdrawal of an EVPN AD route from the second device, the first device may update the ESI status flag to indicate that the host on the ethernet segment (ES) is reachable only via the third device and update the entry that was based on the IP route for the host received by the second network device to prevent sending traffic to the host via the second device.

23 Claims, 6 Drawing Sheets

SYSTEMS AND METHODS FOR CONVERGENCE OF NETWORK TRAFFIC AFTER AN INTERRUPTION OF A NETWORK DEVICE'S LINK

CROSS-REFERENCE TO RELATED APPLICATIONS

This application claims priority to Greek Application No. 20200100582 filed on Sep. 25, 2020, and titled "MECHANISM IN AN EVPN NETWORK FOR FAST CONVERGENCE AFTER LOST OF CONNECTION TO A MULTIHOMED SITE," by Lo et al., incorporated by reference herein as though set forth in full.

BACKGROUND

The present disclosure relates to optimizing convergence of network traffic in an Ethernet Virtual Private Network (EVPN) environment, in particular, using status indicators to quickly update a remote network device's forwarding tables after a redundant network device's link to an ethernet segment is interrupted.

SUMMARY

In some computer networks, network devices (e.g., routers, switches, etc.) are configured in multihoming topologies, where two or more network devices provide an active redundant connection to the same host (e.g., a virtual machine host). In an ethernet virtual private network (EVPN), the various direct connections between a multihomed host and the redundant network devices (e.g., Provider Edge devices) are referred to as ethernet segments (ES) and are assigned ethernet segment identifiers (ESI). The redundant network devices advertise, to each other and to other network devices with which they maintain an EVPN session, a route (such as an EVPN auto discovery (AD) route) for the ES. An EVPN AD route, referred to as an EVPN AD per ES route, is advertised by the redundant network devices for each ES to which they are directly connected.

In this configuration, all of the redundant network devices will advertise, to each other and to remote network devices, EVPN AD routes for the ES. In addition, each redundant network device will advertise to remote network devices MAC/IP routes for each host that is available with the ES. In some embodiments, hundreds or thousands of hosts may be available with the ES. Remote network devices use the received MAC/IP routes to determine that the advertised MAC/IP addresses are reachable. The remote network devices are then able to derive Layer 3 (L3) routes based on the received IP routes and can further install the derived L3 routes into their routing tables.

Thus, all network devices in the EVPN control plane that are not local to the ES are configured to send traffic destined for the multihomed host to the ES that is reachable via any of the redundant network devices. This configuration provides great efficiency for network traffic going to and from the multihomed host, particularly if the multihomed host is a very active host, such as a hypervisor running multiple virtual machines.

If a redundant network device's link to the ES is interrupted, said network device will withdraw all advertised MAC/IP routes for all the hosts on the ES affected by the interruption. However, this process takes time, as each MAC/IP route that is affected by the interrupted link is withdrawn separately. For example, if fifty MAC/IP routes are affected, then fifty separate MAC/IP routes are withdrawn one at a time. As each MAC/IP route is withdrawn, the other network devices process each withdrawal and update their respective forwarding tables. Not only does this process result in prolonged outages, but it also leads to loss of traffic, because as each withdrawal is processed, network traffic continues to flow. In the example described above, if the network device that is experiencing a link failure has only been able to withdraw thirty affected MAC/IP routes, there are still twenty MAC/IP routes that are affected by the link disruption and have not been withdrawn yet. The MAC/IP routes that have not been withdrawn are still being used by the other network devices to route traffic, resulting in traffic being routed inefficiently.

As described in "BGP MPLS-Based Ethernet VPN" standard as found in https://tools.ietf.org/html/rfc7432, which is herein incorporated by reference in its entirety, when a redundant network device's link to an ES is interrupted, said network device withdrawals the corresponding set of EVPN AD routes for the affected ES. The withdrawal of EVPN AD routes for the affected ES only carries Layer 2 (L2) route targets so only L2 routes can be updated. For example, a withdrawal of EVPN AD routes causes all network devices that receive said withdrawal to update their L2 routes. L3 routes are not updated because the withdrawal of EVPN AD routes only carries L2 route targets and thus are only used for updating L2 routes. Accordingly, current techniques have no methodologies for quickly converging L3 routes upon a receipt of a withdrawal of an EVPN AD route for an affected ES.

Various systems and methods described herein address these problems by providing a mechanism for faster convergence of network traffic after a network device's link is interrupted by leveraging the withdrawal of the EVPN AD route to also quickly uninstall associated L3 routes derived from IP routes that were received from the same network device that is now withdrawing the EVPN AD route.

In some embodiments, a remote network device will receive AD per ES routes from a redundant network device for each ES to which said redundant network device is directly connected. There may be a plurality of hosts reachable through each ES to which the redundant network device is connected. The remote network device uses the AD per ES routes advertised by the redundant network devices to create an ESI connected status. The ESI connected status indicates whether each redundant network device is connected to an ES, for each of the redundant network devices. The ESI connected status is maintained based on receiving AD per ES routes from respective redundant network devices and based on revocation of the AD per ES routes from respective redundant network devices.

The remote network device will also receive MAC/IP routes for hosts that are available on the ES from each of the redundant network devices. Whenever the remote network device receives such a MAC/IP route from a redundant network device, it checks the ESI connected status to ensure that the redundant network device from which the MAC/IP route was received is known to still be connected to the ES. The remote network device will import an L3 route derived from said MAC/IP route into its forwarding table only if the ESI connected status indicates that the redundant network device, from which the MAC/IP route is received, is connected to the ES.

Upon a successful ESI connected status check, the remote network device imports the derived L3 routes into its forwarding table and indicates which redundant network device sent the MAC/IP routes from which the L3 routes were derived. For example, a first received MAC/IP route will indicate L3 connectivity to the host via the first redundant network device, and the second MAC/IP route will indicate L3 connectivity to the host via the second redundant network device. In some embodiments, the remote network device may then use the usual Border Gateway Protocol (BGP) processing to compute the best path to the host using the installed routes that were derived based on the received MAC/IP route. For example, the remote network device may create an equal-cost multi-path (ECMP) group with both routes to install two-way ECMP for L3 reachability to the host.

Advantageously, an ESI connected status may be associated with all L3 routes installed into the forwarding table of the remote network device that were based on IP routes for an ES received from a certain redundant remote network device. In this way, the eligibility of the L3 routes may depend on the associated ESI connected status. If the ESI connected status indicates that a redundant network device is not connected to the ES (e.g., because the AD per ES route was withdrawn by that redundant network device), the L3 routes, supported by the redundant network device without connection, will be updated to use only paths that are not affected by the AD per ES route withdrawal. For example, the remote network device may have previously configured an L3 route to a host that points to a two-way ECMP for L3 reachability to a host that was configured based on IP routes to the host received from two redundant network devices. This ECMP may mirror the ESI connected status. Accordingly, an update to the ESI connected status that indicates loss of connectivity to the host by one of the redundant network devices will cause the ECMP to be converted into a single path (i.e., a path via the other redundant network devices not affected by loss of connectivity). In this way, the update to the ESI connected status results in a quick update to the related L3 route (e.g., route that pointed to this ECMP). Advantageously, all L3 routes that pointed to this ECMP are updated in one shot to use the single path.

If the first redundant network device's link to an ES is interrupted, said device will withdraw the AD per ES route for the affected ES. The remote network device will receive a withdrawal and update the ESI connected status to indicate that the redundant network device has no link to the ES. The change in the ESI connected status will also cause the L3 routes, based on IP routes for an ES received from the same redundant network device, to be updated (e.g., to point to a single path instead of an ECMP).

This approach allows network devices to quickly update their L3 forwarding tables in response to a withdrawal of a single AD per ES route, allowing faster convergence after a network device's link is interrupted. Interruptions to network traffic are minimized because network devices are no longer required to wait for network devices experiencing link interruptions to withdraw each and every MAC/IP route affected by the link interruption. When MAC/IP routes affected by the link interruption are withdrawn, the remote network device will mark them ineligible; however, because the hardware forwarding is already updated as described above, no further changes to hardware will occur. In addition to increasing the speed at which the traffic is rerouted, this approach allows for increased network fortitude because any network device in the EVPN network is able to quickly update its forwarding table for any EVPN multihoming site in response to link interruptions.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
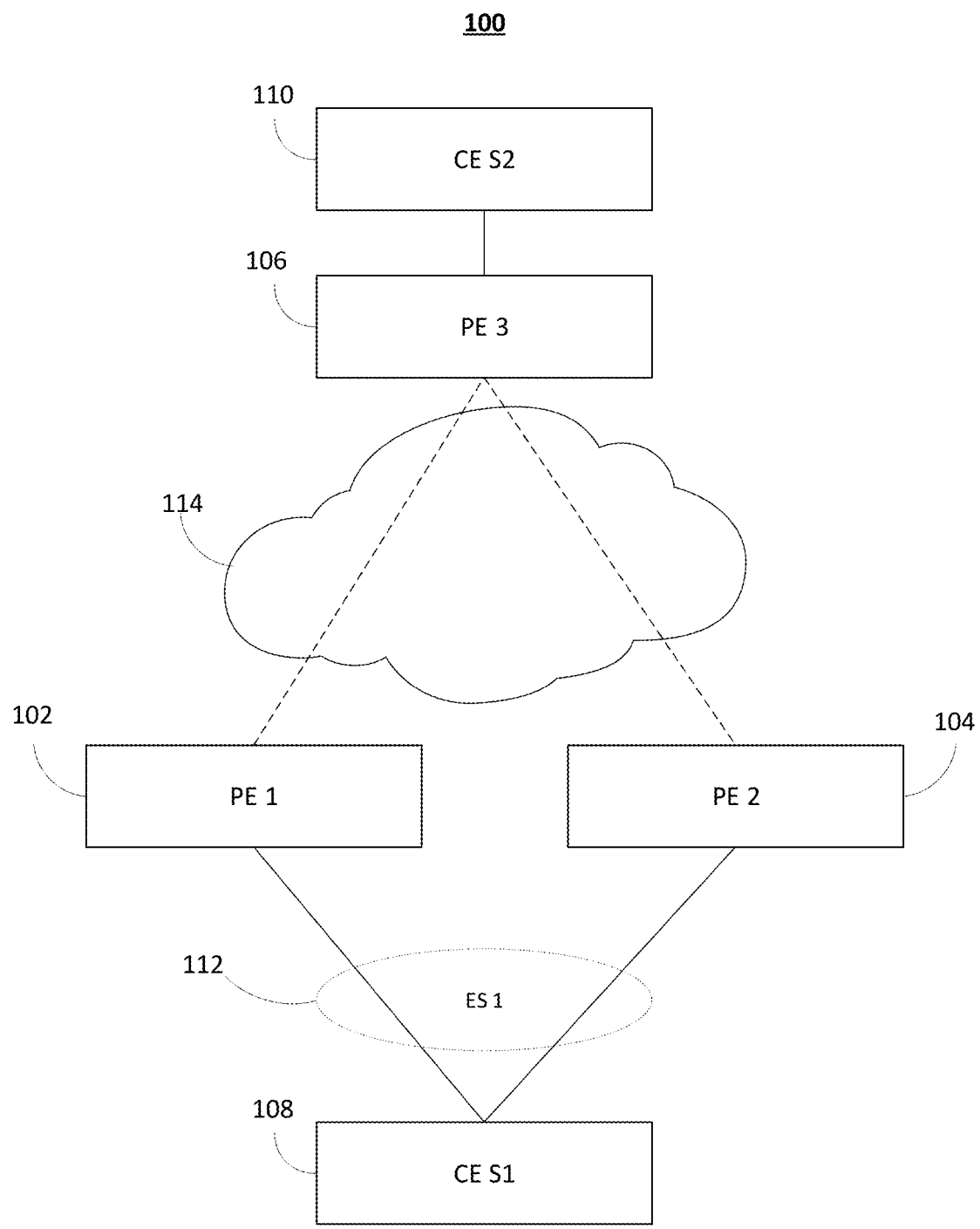
FIG. 1A shows an illustrative network topology of a system for optimizing convergence of network traffic in an EVPN environment, in accordance with some embodiments of the disclosure.

FIG. 1A shows an illustrative diagram of system 100 for optimizing convergence of network traffic in an EVPN environment configured for devices (e.g., routers, switches, etc.) 110, 106, 102, 104, and 108. In some embodiments, links between devices 110, 106, 102, 104, and 108 may be an overlay configured over an underlay of physical devices.

System 100 is shown as having two customer edge (CE) devices: server 108 and server 110. System 100 is also shown as having three provider edge (PE) devices: PE 102, PE 104, and PE 106. One skilled in the art would understand that the same techniques described herein may be used by a system containing any number of PE devices, and CE devices servicing any number of ethernet segments. In some embodiments, server 108 and server 110 may serve several virtual machines, each with its own Layer 2 address (e.g., MAC address). For example, server 108 may include a hypervisor managing multiple virtual machine instances.

In the shown embodiment, PE 102 and PE 104 have direct connections to server 108 using ethernet segment (ES) links, which are configured with label ES 1. In some embodiments, PE 102 and PE 104 are eligible to receive network traffic (e.g., network packets) from PE 106 via links across the cloud 114 (e.g., via the backbone of an EVPN system, for example, using inter-connected servers such as the internet as the undelay) and forward the network traffic to server 108 via ES 112. As mentioned, the illustrated links across the cloud 114 and/or ES 112 may be an EVPN overlay configured over an underlay of physical devices. PE 102 and PE 104 may also receive network traffic from server 108 via ES 112 and forward the network traffic to PE 106 via links across the cloud 114.

In an embodiment, PE 102 and PE 104 advertise, to each other and to other network devices with which they maintain an EVPN session, an EVPN AD per ES route for ES 112. An EVPN AD per ES route, which can be referred to as an AD per ES route, is advertised by PE 102 and PE 104 for each ES to which they are directly connected (while only ES 112 is shown, each of PE 102 and 104 may be connected to any number of ESs). In addition, PE 102 and PE 104 will advertise MAC/IP routes for each host that is available with ES 112. In an embodiment, server 108 includes multiple hosts (e.g., thousands), which are available using PE 102 and PE 104 and their direct link to server 108 using ES 112. While only CE 108 is shown as connected to PE 102 and 104 via ES 112, any number of physical and virtual customer edge equipment devices may be connected to PE 102 and 104 via ES 112. In some embodiments, PE 102 and PE 104 are configured in an active-active multihoming configuration to service all CEs connected to them via ES 112. In this configuration, each of the CEs on ES 112 may be reached either via PE 102 or PE 104. While only two PEs are shown as providing such active-active multihoming service, such active-active multihoming service may be provided to ES 112 by any number of multihoming provider edges.

In an embodiment, PE 106 receives AD per ES routes (e.g., including an AD per ES route for ES 112) from PE 102 and PE 104. PE 106 uses the AD per ES routes to create and store in its memory an ESI status flag, which indicates whether the sender of the AD per ES routes is currently actively connected to an ES. The ESI status flag may be maintained based on receiving AD per ES routes from respective devices and based on revocation of the AD per ES routes from said devices. For example, when PE 106 receives an AD per ES route from PE 102, PE 106 updates an ESI status flag indicating that PE 102 is connected to ES 112. If PE 106 receives a withdrawal of an AD per ES route from PE 102, PE 106 updates the ESI status flag indicating that PE 102 is no longer connected to ES 112.

In an embodiment, PE 106 also receives a first set of MAC/IP routes for each host available via ES 112 from PE 102 (e.g., for each virtual machine host available through server 108). Upon receipt, PE 106 checks the ESI status flag to determine if PE 102 is still connected to ES 112. If the ESI status flag indicates that PE 102 is connected to ES 112, then PE 106 imports a first set of L3 routes, derived from the IP routes of the first set of MAC/IP routes, into its forwarding table and indicates that the first set of L3 routes are associated with PE 102 (the sender of the first set of MAC/IP routes). In an embodiment, PE 106 receives a second set of MAC/IP routes for the same hosts from PE 104. After a successful ESI status flag check (for the status of PE 104), PE 106 imports a second set of L3 routes, derived from the IP routes of the second set of MAC/IP routes, into its forwarding table and indicates that the second set of L3 routes are associated with PE 104 (the sender of the second set of MAC/IP routes). In such an embodiment, PE 106 may use BGP processing algorithms to compute the best path to the host using the installed first and second set of MAC/IP routes. For example, PE 102 can create an ECMP group with the first and second set of MAC/IP routes to install a two-way ECMP group for L3 reachability to the hosts. In some embodiments, PE 102 will use only the IP routes included in the first and second set of IP routes to install a two-way ECMP group for L3 reachability to the hosts. PE 106 will be configured to send traffic destined for server 108 to ES 112, which is reachable via PE 102 and PE 104 using the configured ECPM route.

Figure 1B:
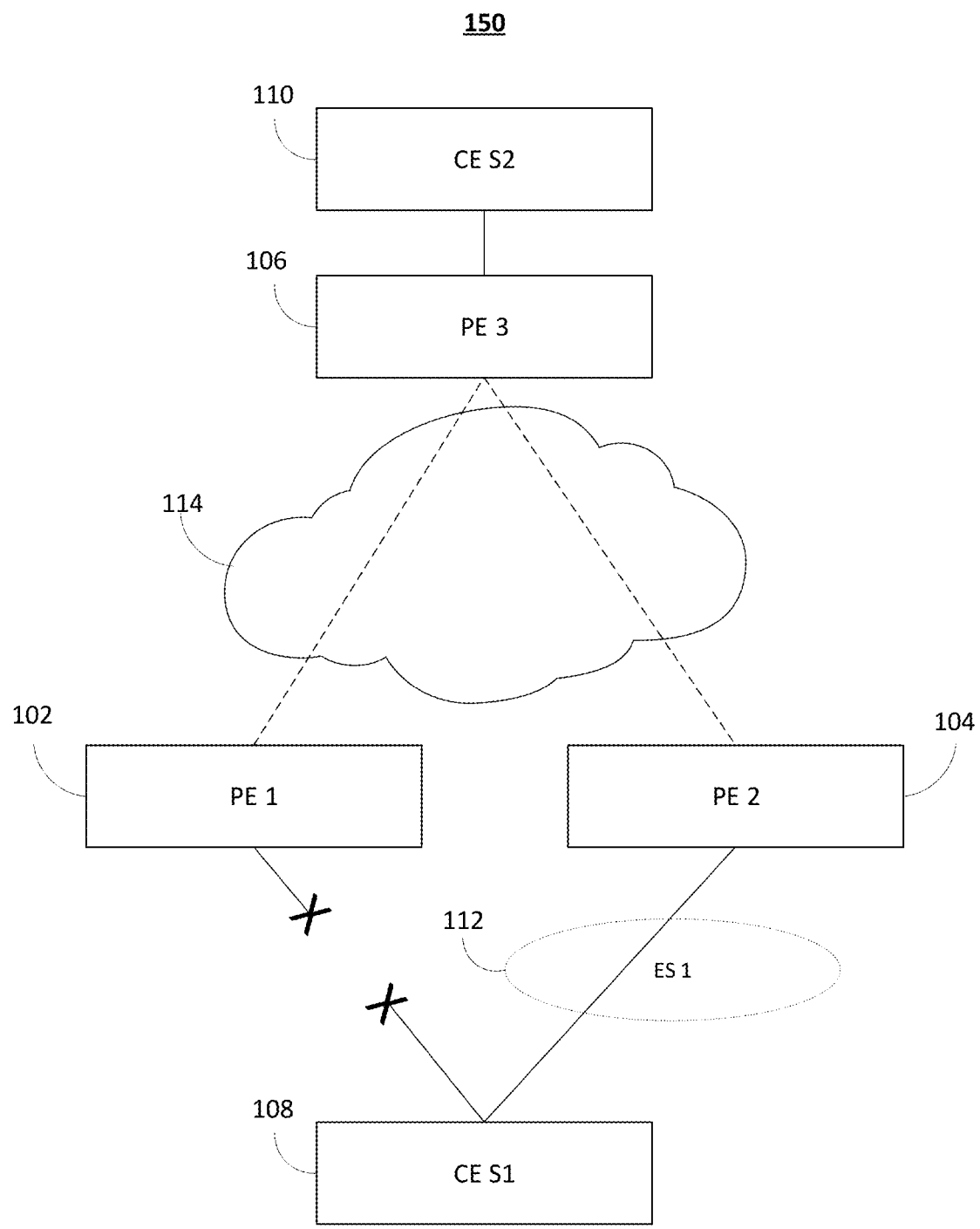
FIG. 1B shows another illustrative network topology of a system for optimizing convergence of network traffic in an EVPN environment, in accordance with some embodiments of the disclosure.

FIG. 1B shows an illustrative diagram of system 150 for optimizing convergence of network traffic in an EVPN environment configured for devices (e.g., routers, switches, etc.) 110, 106, 102, 104, and 108. System 150 may have the same devices and links as shown in system 100 except the link between PE 102 and server 108 is interrupted or down. Such an event will have wide implications in network 150 and will affect traffic flows from PE 106 to server 108. While server 108 may still be reachable, a large amount of traffic may be affected by out-of-date tables that were created when PE 106 was aware that server 108 on ES 112 was reachable through both PE 102 and PE 104.

In one approach, when an ES link becomes broken or down, the devices of system 150 will need to take elaborate repair steps. First, PE 102 (which lost the ES 112 link) will withdraw the AD per ES 112 route. PE 102 will also withdraw MAC/IP routes for all advertised EVPN MAC/IP routes separately for each host affected by the interruption. This will cause the other network devices (e.g., PE 106) to process each withdrawal and update their respective forwarding tables causing updates of entries to be installed or created where the entries will point to PE 104. Only after all these steps are complete will the functionality of system 150 recover. Not only does this process result in prolonged outages, but it also leads to inefficient traffic routing, because as each withdrawal is processed, network traffic continues to flow. If PE 102, which is experiencing a link failure, has only been able to withdraw half the affected MAC/IP routes, there are still a number of MAC/IP routes which are affected by the link disruption that have not been withdrawn yet. As a result, PE 106 will route traffic inefficiently when it relies on the MAC/IP routes that have not yet been withdrawn.

To overcome this problem, network devices can use the ESI status flag to more quickly uninstall/change L3 routes upon receiving a single withdrawal of an AD per ES route. For example, in response to receiving a withdrawal of an AD per ES route from PE 102, PE 106 may be configured to update the ESI status flag related to whether PE 102 is connected to ES 112. In an embodiment, in response to the ESI status flag being updated, all the L3 routes derived from the MAC/IP routes that require PE 102 to be connected to ES 112 will not be used to route traffic. For example, if a two-way ECMP for L3 reachability to server 108 was configured using addresses of PE 102 and PE 104, the updated ESI status flag will cause an update to the associated ECMP construct (e.g., by replacing the ECPM construct with a single next hop) causing all affected L3 routes to be updated, resulting in a single updated path to server 108 using PE 104.

Figure 2:
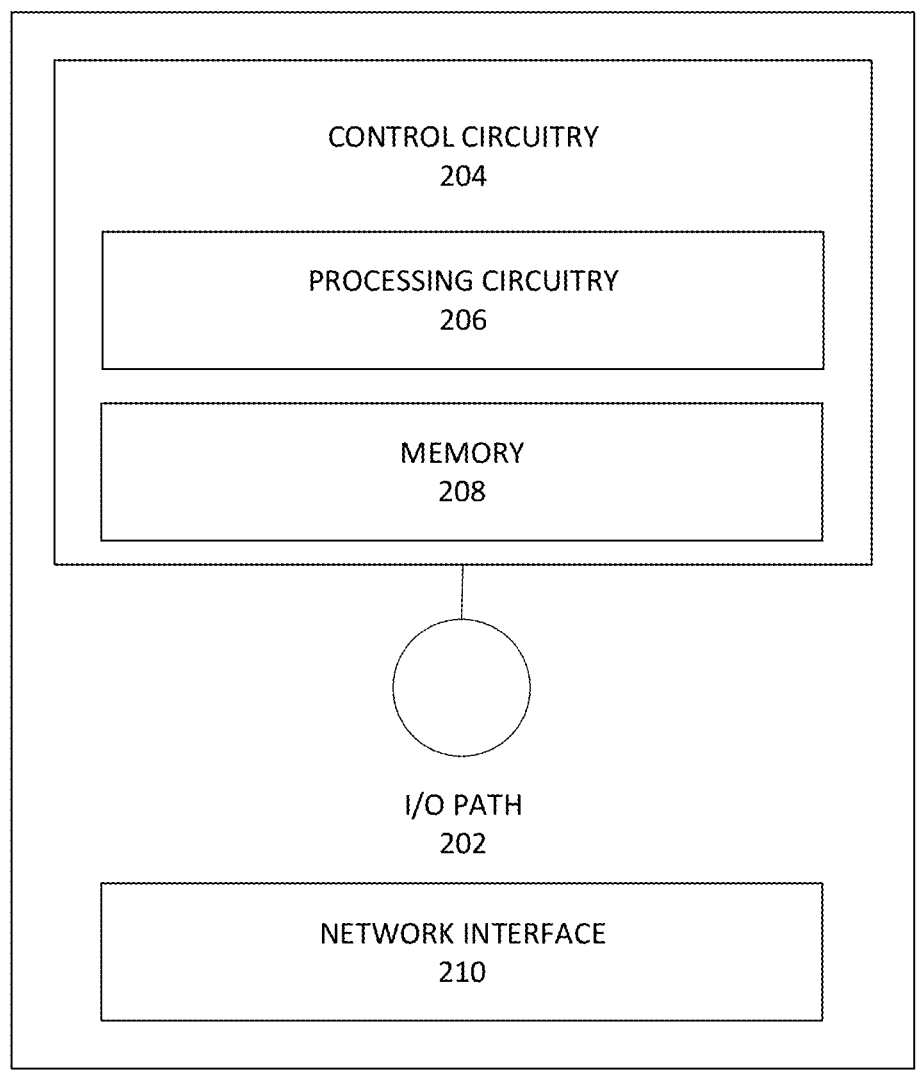
FIG. 2 shows a diagram of an illustrative network device for optimizing convergence of network traffic in an EVPN environment, in accordance with some embodiments of the disclosure.

FIG. 2 shows a generalized embodiment of a network device usable in a system for optimized convergence of network traffic, in accordance with some embodiments of the disclosure. In particular, a device 200 of FIG. 2 may be any of the devices depicted in FIGS. 1A and 1B (e.g., devices 102, 104, 106, 108, and 110) or may be a physical or virtual device hosting any of physical or virtual devices 102, 104, 106, 108, and 110. Device 200 may be a router, an L3 switch, an L2 router, or a host, and/or any other computing device that may be configured to participate in EVPN switching or routing. Device 200 may receive data via data network interface 210 and provide the received data to control circuitry 204 via an input/output (I/O) path 202. Control circuitry 204 includes processing circuitry 206 and storage 208. Storage 208 may include volatile memory 330 (such as random-access memory (RAM), for example, static RAM and/or dynamic RAM), which does not retain its contents when power is turned off, and non-volatile memory 208 (such as, for example, a solid state drive (SSD), a hard disk drive (HDD), electrically erasable programmable read-only memory (EEPROM), etc.), which does retain its contents when power is turned off. Control circuitry 204 may send and receive commands, requests, and other suitable data using I/O path 202. As noted above, I/O path 202 connects control circuitry 204 (and specifically processing circuitry 206) to network interface 210, which in turn connects device 200 to one or more other devices. For example, I/O path 202 may provide route packets to next hops listed in a forwarding table.

Control circuitry 204 may be based on any suitable processing circuitry, such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 204 executes instructions suitable to implement any of the techniques described above or below.

Storage 208 may be an electronic storage device that is part of control circuitry 204. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 208 may include a MAC table, e.g., as shown in FIG. 3. Multiple circuits may be provided to handle simultaneous processing functions. In some embodiments, device 200 may be a virtual device, wherein components 204, 206, 208, 202 and 210 are virialized on top of another physical device.

Figure 3A:
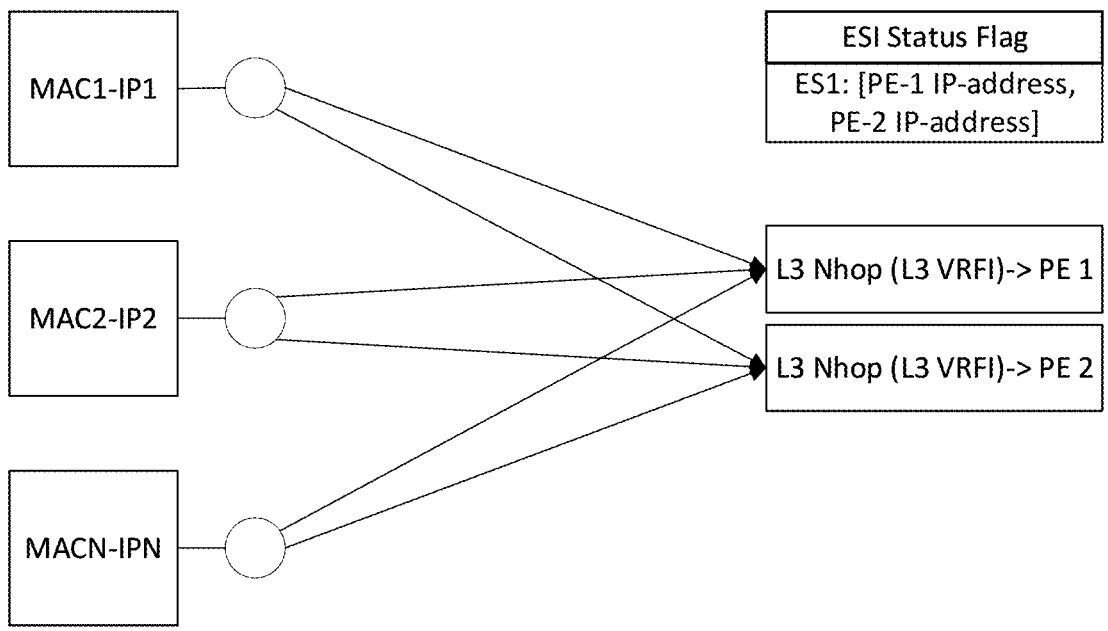
FIG. 3A shows a diagram of an illustrative table for use in optimized convergence of network traffic, in accordance with some embodiments of the present disclosure.

FIG. 3A shows a diagram of an illustrative table 300 for use in optimized convergence of network traffic, in accordance with some embodiments of the present disclosure. In particular, table 300 may have been configured by PE 106 when system 100 was healthy (e.g., when a link between PE 102 and ES 112 was operational).

Table 300 includes L3 routes derived from the MAC/IP routes advertised by all of the redundant network devices. Table 300 may have an ESI status flag indicating that certain redundant network devices have connectivity to a particular ES. The ESI status flag is maintained based on receiving AD per ES routes from respective redundant network devices and based on revocation of the AD per ES routes from the respective redundant network devices. For example, when system 100 is healthy, PE 102 will advertise an AD per ES route, which will cause the ESI status flag to indicate that PE 102 has connectivity with ES 112. Table 300 also includes MAC addresses and IP addresses reachable by the L3 routes that use ES 112. For example, MAC1 can be the MAC address of CE 108 (or a host available through CE 108), and IP1 can be the IP address of CE 108 (or a host available through CE 108). Each MAC address and IP address is associated with paths that may include different next hops, listing an address and/or label of the next hop to which traffic may be routed, when that traffic is destined for a device associated with the respective MAC address. As shown, table 300 shows only a single ESI, while in some embodiments, table 300 includes a plurality of ESI status flags corresponding to a plurality of ESs.

In an embodiment, the L3 routes for the MAC addresses and IP addresses in table 300 are derived from MAC/IP routes advertised by redundant network devices (e.g., devices PE 102 and 104). The L3 routes derived from a MAC/IP route are installed in table 300 after PE 106 checks the ESI status flag associated with the redundant network device, from which the MAC/IP route was received. For example, PE 106 will import a route, derived from a MAC/IP route received from PE 102, into table 300 only if the ESI status flag indicates that PE 102 is connected to ES 112.

MAC1-IP1 can correspond to the MAC address and IP address of CE 108 (or of one of the virtual machines handled by CE 108 when CE 108 acts as a hypervisor). Initially, MAC1-IP1 may be associated with a single path using a single next hop (e.g., where the single path uses PE 102). The single path for MAC1-IP1 can be installed into table 300 if the ESI status flag associated with PE 102, which advertised the route from which the single path was derived, indicates that PE 102 is connected to ES 112. Later, PE 106 may receive, from PE 104, an AD per ES route, which will cause the ESI status flag to indicate that PE 104 has connectivity with ES 112. PE 106 may receive, from PE 104, a MAC/IP route for the same address (e.g., MAC1-IP1). The message may advertise address MAC1 and/or IP1 and identify information used to create a second path using a different next hop (e.g., where the second path uses PE 104). PE 106 may determine that address MAC1 and/or IP1 can be reached using a second path derived from the information advertised from PE 104. The second path for MAC1 and/or IP1 will only be installed into table 300 if the ESI status flag associated with PE 104, which advertised the route from which the second path was derived, indicates that PE 104 is connected to ES 112.

As shown, MAC1-IP1 is multihomed using more than one device. For example, both paths (using PE 102 and PE 104) for MAC1-IP1 can be used to route traffic providing multihoming functionality. In table 300, because the ESI status flag indicates that PE 102 and PE 104, each supporting a different path, both have connectivity to the ES, the L3 routes point to an established two-way ECMP construct for L3 reachability to MAC1-IP1. For example, an ECMP construct may indicate that MAC1-IP1 is reachable by one of two L3 next hops, one L3 next hop associated with PE 102 and one L3 next hop associated with PE 104.

In some embodiments, similar steps may be used to associate additional MAC addresses and IP addresses (e.g., MAC2-IP2-MACN-IPN that are accessible via the same ES). In some embodiments, the other MAC and/or IP addresses in table 300 may be real devices on ES 112 or virtual devices administered by CE 108. Advantageously, the table may link MAC and/or IP addresses of multiple devices (e.g., virtual devices available via ES 112) to the same ECMP construct, where the single ECMP construct is associated with a single ESI status flag.

Figure 3B:
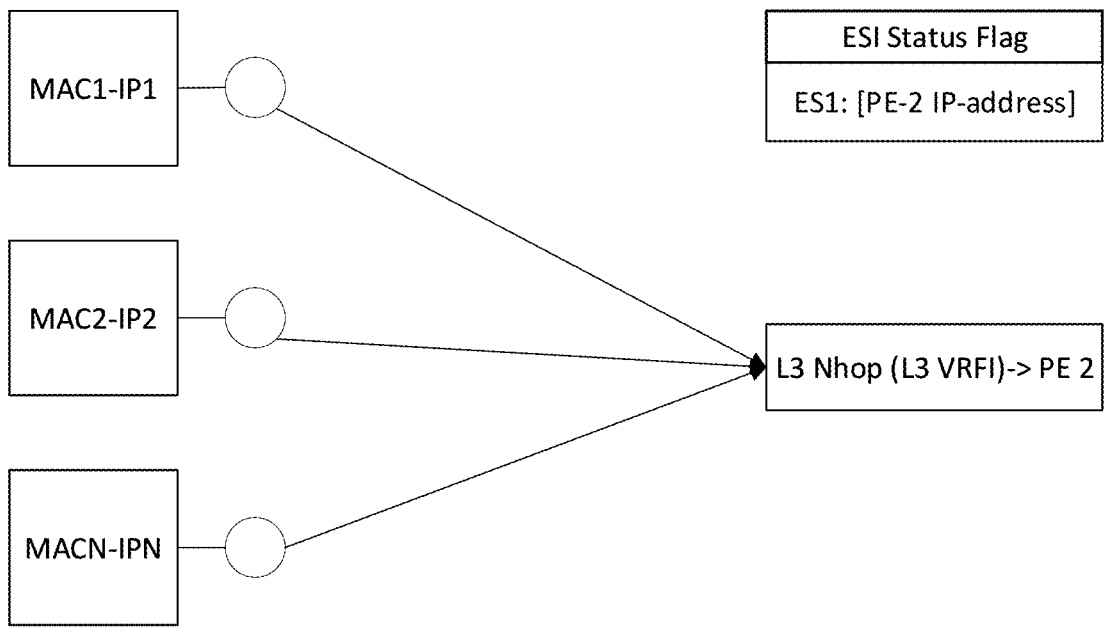
FIG. 3B shows another diagram of an illustrative table for use in optimized convergence of network traffic, in accordance with some embodiments of the present disclosure.

FIG. 3B shows a diagram of an illustrative table 350 for use in optimized convergence of network traffic, in accordance with some embodiments of the present disclosure. In particular, table 350 may have been configured by PE 106 when system 150 was damaged (e.g., when the link between PE 102 and ES 112 was interrupted). In some embodiments, PE 106 may proactively create table 350 by modifying table 300 in an event when the link between PE 102 and ES 112 is interrupted.

In particular, PE 106 may modify table 350 to update the ESI status flag associated with PE 102 being connected to ES 112. If PE 102 withdraws an AD per ES route, PE 106 will update the ESI status flag related to PE 102's connectivity to ES 112. For example, the ESI status flag may indicate that only PE 104 is connected to ES 112. The updated ESI status flag causes PE 106 to no longer use the L3 routes supported by PE 102 to route network traffic, because PE 102 has lost connectivity to ES 112. In an embodiment, the ECPM construct is replaced with a single L3 next hop associated PE 104 (which still has a functioning link to ES1). Because L3 next hops for multiple MAC and/or IP addresses (e.g., MAC1-IP1, MAC2-IP2, and MACN-IPN) were all pointing to the same the ECPM construct, this change results in a simultaneous update to multiple rules for handling traffic to multiple MAC and/or IP addresses on the same ES to use a single path. This approach allows PE 106 to quickly update table 300 in response to a withdrawal of a single AD per ES route, allowing faster convergence after PE 102's link is interrupted. Interruptions to network traffic are minimized because PE 106 does not have to wait for PE 102 to withdraw each and every MAC/IP route affected by the link interruption. In some embodiments, by the time MAC/IP route withdrawals are received, they will not cause further changes to table 350. In an embodiment, PE 106 will mark the L3 routes, supported by PE 102 as ineligible based on the updated ESI status flag. In some embodiments, the L3 routes supported by PE 102 are uninstalled from the hardware of PE 106.

Figure 4:
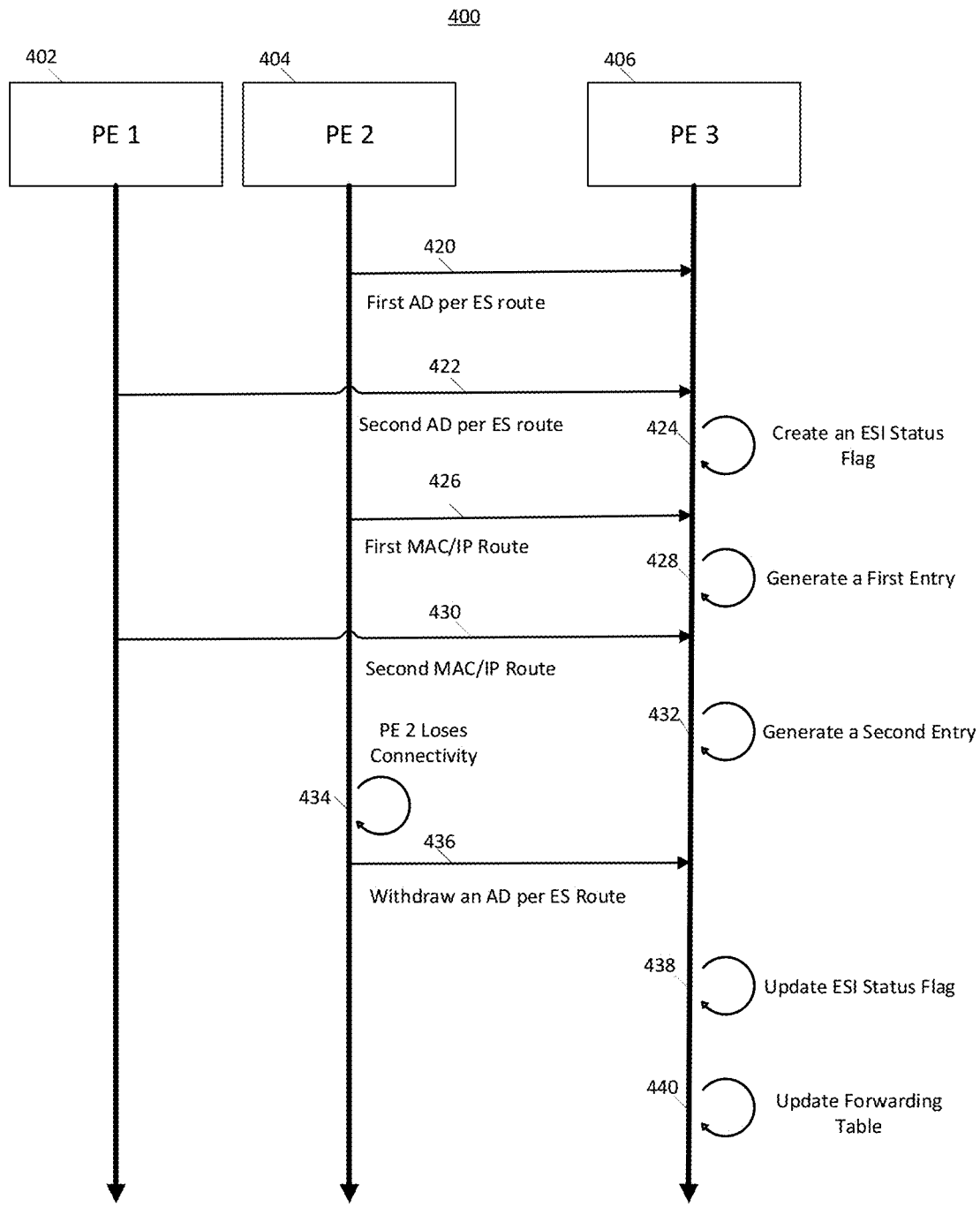
FIG. 4 is a flowchart of an illustrative process for optimizing convergence of network traffic, in accordance with some embodiments of the present disclosure.

FIG. 4 is a flowchart of a detailed illustrative process for optimized convergence of network traffic, in accordance with some embodiments of the present disclosure. Process 400 may be performed by physical or virtual control circuitry, such as control circuitry 204 of device 200 (FIG. 2). For example, process 400 may be performed by control circuitries of devices 110, 106, 102, 104, and 108.

In some embodiments, some steps of process 400 may be performed by one of several devices, for example, PE 402, PE 404, PE 406, and, optionally, any other number of PE devices. For example, PE 402, PE 404, and PE 406 may correspond respectively to PEs 104, 102, and 106, of FIGS. 1A and 1B.

At step 420, PE 404 advertises, to PE 406, a first AD per ES route for an ES to which PE 404 is directly connected. PE 404 will also advertise the first AD per ES route to each network device with which it maintains an EVPN session. At 422, PE 402 will advertise, to PE 406, a second AD per ES route for the same ES because PE 402 is also directly connected to the ES. PE 402 and PE 404 advertise the first and second AD per ES routes, to each other and to other network devices with which they maintain an EVPN session.

At step 424, PE 406 uses the first and second AD per ES routes to create an ESI status flag, where the ESI status flag indicates whether the sender of an AD per ES route is connected to the ES. For example, PE 406 uses the first AD per ES route, received from PE 404, to create an ESI status flag relating to the connected status of PE 404. Further, PE 406 uses the second AD per ES route, received from PE 402, to update the ESI status flag relating to the connected status of PE 402. The ESI status flag may be maintained based on receiving AD per ES routes and receiving revocation of the AD per ES routes from devices on the ES. Although step 424 describes updating the ESI status flag using both the first and second AD per ES route at the same time, the ESI status flag can be updated at separate times as network devices send AD per ES routes. For example, PE 406 can use the first AD per ES route, received from PE 404, to make an update to an ESI status flag, relating to the connected status of PE 404, without receiving the second AD per ES route from PE 402.

At step 426, PE 404 advertises a first MAC/IP route for a host that is available with the ES. In an embodiment, PE 404 advertises MAC/IP routes for each host that is available with the ES. In some embodiments, thousands of hosts are available using PE 404 and its direct link to the ES.

At step 428, PE 406 generates a first entry. The first entry is an L3 route derived from an IP route shared by PE 404 in step 426. Whenever PE 406 receives a MAC/IP route from a redundant network device (e.g., PE 404), it checks the ESI status flag associated with the redundant network device to ensure that the redundant network device, from which the MAC/IP route was received is known to be connected to the ES. PE 406 will import an L3 route, derived from the advertised MAC/IP route, into its forwarding table only if the ESI status flag indicates that PE 404, from which the MAC/IP route is received, is connected to the ES.

At step 430, PE 402 advertises a second MAC/IP route for the host that is available with the ES. The second MAC/IP route is for the same host but uses PE 402 instead of PE 404. In an embodiment, PE 402 advertises MAC/IP routes for each host that is available with the ES.

At step 432, PE 406 generates a second entry. The second entry is an L3 route derived from the IP route shared by PE 402 in step 430. PE 406 checks the ESI status flag associated with PE 402 to ensure that PE 402, from which the MAC/IP route was received, is still connected to the ES. PE 406 will import the L3 route derived from the second advertised MAC/IP route into its forwarding table only if the ESI status flag indicates that PE 402, from which the second MAC/IP route is received, is connected to the ES.

In some embodiments, PE 406 will determine that a host is reachable through more than one device. For example, the L3 routes derived from the first and second MAC/IP routes may route traffic to the same host using different paths. Accordingly, all paths for a host can be used to route traffic, providing multihoming. In an embodiment, if the ESI status flag indicates that two devices (e.g., PE 402 and PE 404), each supporting a different path, both have connectivity to the ES, and an L3 route may point to a two-way ECMP for L3 reachability to the host.

At step 434, PE 404 may lose connectivity to the ES. In this case, at 436, PE 404 may withdraw an AD per ES route from PE 406. The withdrawal of the AD per ES route may cause, at step 438, PE 406 to update the ESI status flag associated with PE 404 being connected to the ES.

At step 440, the updated ESI status flag will cause PE 406 to update its forwarding table (e.g., as explained in connection with FIGS. 3A and 3B). The L3 routes that use PE 404 are updated to use paths that are not affected by PE 404's withdrawal of an AD per ES route. In an embodiment, all L3 routes that point to a two-path ECMP where one of the paths uses PE 404 are updated to use a single path. This approach allows PE 406 to quickly update its forwarding table in response to a withdrawal of a single AD per ES route, allowing faster convergence after PE 404's link is interrupted.

Figure 5:
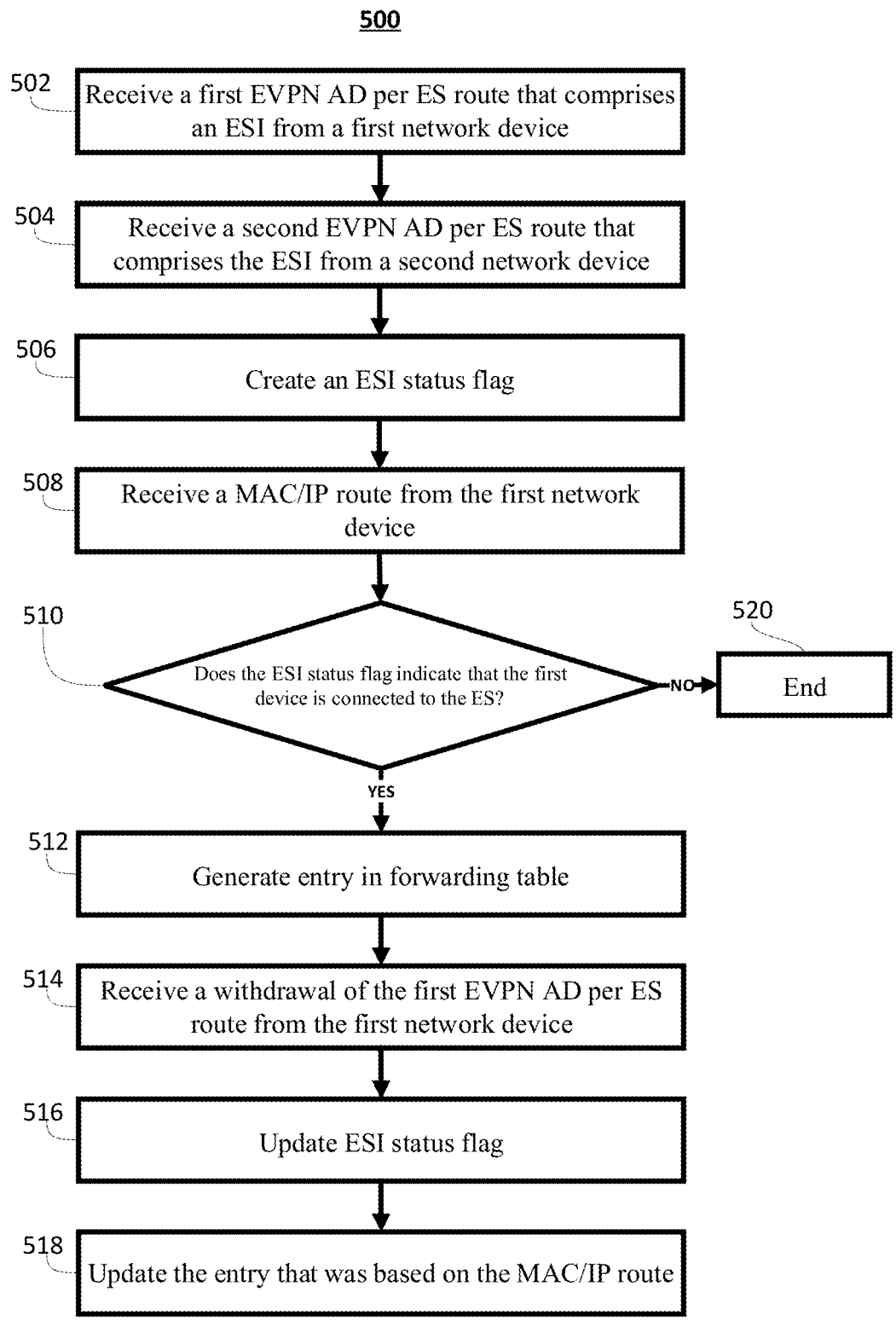
FIG. 5 is a flowchart of an illustrative process for optimizing convergence of network traffic, in accordance with some embodiments of the present disclosure.

FIG. 5 is a flowchart of an illustrative process for optimizing convergence of network traffic, in accordance with some embodiments of the present disclosure. Process 500 may be performed by physical or virtual control circuitry, such as control circuitry 204 of device 200 (FIG. 2). For example, process 500 may be performed by control circuitry of PE 106 of FIG. 1.

At 502, control circuitry receives a first EVPN AD per ES route that comprises an ESI from a first network device. At 504, control circuitry receives a second EVPN AD per ES route that comprises the ESI from a second network device.

At 506, control circuitry creates an ESI status flag. For example, control circuitry can use the first EVPN AD per ES route received from the first network device to create an ESI status flag relating to the connected status of the first network device. The control circuitry may also update the ESI status flag in response to receiving the second EVPN AD per ES route from the second network device. In an embodiment, control circuitry uses the first and second EVPN AD per ES routes to update the ESI status flag, where the ESI status flag indicates whether the senders of the EVPN AD per ES routes are connected to the ES. The ESI status flag may be maintained based on receiving EVPN AD per ES routes from the first and second network devices and based on revocation of the EVPN AD per ES routes from the first and second network devices. Although step 506 describes updating the ESI status flag based on both the first and second EVPN AD per ES routes at the same time, the ESI status flag can be updated in response to receiving a single EVPN AD per ES route.

At 508, control circuitry receives a MAC/IP route from the first network device, where the MAC/IP route is for a host that is available on the ES. In an embodiment, the control circuitry receives a plurality of MAC/IP routes from the first network, where the MAC/IP routes are for a plurality of hosts that are available with the ES. The plurality of hosts can include thousands of hosts available using the first network device and its direct link to the ES.

At step 510, control circuitry determines whether the ESI status flag indicates that the first network device is connected to the ES. If the ESI status flag indicates that the first network device is connected to the ES, the process continues to step 512. If the ESI status flag indicates that the first network device is not connected to the ES the process ends at step 520 and no routes derived from the MAC/IP routes are installed in the memory of the control circuitry.

At step 512, control circuitry will generate an entry in its forwarding table. In an embodiment, control circuitry derives an entry from the MAC/IP route received in step 508 from the first network device. Once the entry is in the forwarding table, the control circuitry is able to route network packets using the entry. For example, if a network packet is to be routed to the host using the MAC/IP route received in step 508 control circuitry can use the entry derived from said MAC/IP routes to transmit the network packet. In some embodiments, if the ESI status flag indicates that the first and second network devices, which each support a different path, have connectivity to the ES, the L3 routes point to a two-way ECMP for L3 reachability to the host to which the network traffic is to be routed.

At step 514, control circuitry monitors for a withdrawal of the EVPN AD per ES route from the first network device. The first network device may send the withdrawal because it has lost connectivity to the ES. If the control circuitry does not receive a withdrawal of the EVPN AD per ES route from the first network device, it continues to monitor. In response to receiving a withdrawal of the EVPN AD per ES route, the control circuitry updates the ESI status flag at step 516. In an embodiment, the updated ESI status flag indicates that the first network device, which sent the withdrawal of the EVPN AD per ES route, is no longer eligible to route network traffic.

At step 518, control circuitry updates the entry that was derived from the MAC/IP route, received in step 508, to prevent sending traffic to the host via the first device. In an embodiment, the control circuitry updates its forwarding table in response to the updated ESI status flag. The entry that was derived from the MAC/IP route that uses the first network device is updated to use paths that are not affected by the first device's withdrawal of the EVPN AD per ES route. Accordingly, any entries that use paths that require the first network device to transport the network packet are no longer used to route traffic. In an embodiment, all entries that point to a two-path ECMP, where one of the paths uses the first network device, are updated to use a single path. This approach allows control circuitry to quickly update its forwarding table in response to a withdrawal of a single EVPN AD per ES route, allowing faster convergence after the first network device's link is interrupted.

The processes 400 and 500 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method comprising:
   receiving, at a first network device from a second network device, a first ethernet virtual private network (EVPN) auto discovery (AD) route that comprises an ethernet segment (ES) identifier (ESI), wherein the second network device is directly connected to the ES;
   receiving, at the first network device from a third network device, a second EVPN AD route that comprises the ESI, wherein the third network device is directly connected to the ES;
   creating an ESI status flag indicating that a host on the ES is reachable via the second network device and the third network device;
   receiving, at the first network device, a plurality of IP routes from the second network device corresponding to a plurality of multihomed hosts on the ES;
   in response to determining that the ESI status flag indicates that the plurality of multihomed hosts on the ES is reachable via the second network device, generating, in a forwarding table of the first network device, an equal-cost multi-path (ECMP) construct based on the plurality of IP routes; and
   in response to receiving, at the first network device from the second network device, a withdrawal of the first EVPN AD route:
      updating the ESI status flag to indicate that the plurality of multihomed hosts on the ES is not reachable via the second network device; and replacing the ECMP construct that was based on the plurality of IP routes to enable sending traffic to the plurality of multihomed hosts via the third network device, with a single next hop, without requiring separate withdrawal of advertised routes associated with the second network device.

2. The method of claim 1, further comprising:
receiving a first data packet addressed to a MAC address of the host;
retrieving, from a forwarding entry associated with the MAC address, a next hop identifier; and
forwarding the first data packet using the next hop identifier.

3. The method of claim 1, wherein the second network device and the third network device provide active-active multihoming to the host via the ES.

4. The method of claim 1, wherein the withdrawal of the first EVPN AD route occurred in response to the second network device losing connection to the ES.

5. The method of claim 1, further comprising uninstalling a plurality of routing table entries, based on the IP route received from the second network device, from hardware of the first network device.

6. The method of claim 1, further comprising:
receiving, at the first network device from a fourth network device, a third EVPN AD route that comprises the ESI, wherein the fourth network device is directly connected to the ES;
updating the ES status flag to indicate that a host on the ES is reachable via the second network device, the third network device, and the fourth network device; and
in response to receiving, at the first network device from the second network device, a withdrawal of the first EVPN AD route, updating the ES status flag to indicate that the host on the ES is reachable via the third network device and the fourth network device.

7. The method of claim 1, further comprising receiving, at the first network device from the second network device, a third EVPN AD route that comprises the ESI, wherein the second network device is directly connected to the ES.

8. The method of claim 7, further comprising:
in response to receiving, at the first network device from the second network device, a third EVPN AD route that comprises the ESI, wherein the second network device is directly connected to the ES;
updating the ESI status flag to indicate that the host on the ES is reachable via the second network device and the third network device; and
updating a routing table entry that was based on the IP route to allow sending traffic to the host via the second device.

9. An apparatus comprising:
a memory configured to store a forwarding table;
communication circuitry configured to:
receive, from a first network device, a first ethernet virtual private network (EVPN) auto discovery (AD) route that comprises an ethernet segment (ES) identifier (ESI), wherein the first network device is directly connected to the ES;
receive, from a second network device, a second EVPN AD route that comprises the ESI, wherein the second network device is directly connected to the ES;
receive a plurality of IP routes from the first network device corresponding to a plurality of multihomed hosts on the ES; and
receive, from the second network device, a withdrawal of the first EVPN AD route; and control circuitry configured to:
create an ESI status flag indicating that a host on the ES is reachable via the first network device and the second network device;
generate, in the forwarding table, an entry based on the plurality of IP routes based on determining that the ESI status flag indicates that the host on the ES is reachable via the first network device or the second network device via an equal-cost multi-path (ECMP) construct;
update the ESI status flag to indicate that the plurality of multihomed hosts on the ES is not reachable via the first network device based on the withdrawal of the first EVPN AD route; and
replace the ECMP construct that was based on the plurality of IP routes to enable sending traffic to the plurality of multihomed hosts via the second network device, with a single next hop, without requiring separate withdrawal of advertised routes associated with the first network device.

10. The apparatus of claim 9, wherein the communication circuitry is further configured to receive a plurality of IP routes from the second network device corresponding to a plurality of hosts on the ES; and
the control circuitry is further configured to:
generate, in a forwarding table, entries based on the IP routes based on determining that the ESI status flag indicates that the plurality of hosts on the ES are reachable via the second network device; and
update the entries that were based on the IP routes to prevent sending traffic to the host via the first device.

11. The apparatus of claim 9, wherein the communication circuitry is further configured to receive a first data packet addressed to a MAC address of the host; and
the control circuitry is further configured to retrieve, from the entry associated with the MAC address, a next hop identifier and forward the first data packet using the next hop identifier.

12. The apparatus of claim 9, wherein the first network device and the second network device provide active-active multihoming to the host via the ES.

13. The apparatus of claim 9, wherein the withdrawal of the first EVPN AD route occurred in response to the first network device losing connection to the ES.

14. The apparatus of claim 9, wherein the communication circuitry is further configured to receive, from the first network device, a third EVPN AD route that comprises the ESI, wherein the first network device is directly connected to the ES.

15. The apparatus of claim 14, wherein the control circuitry is further configured to:
update the ESI status flag to indicate that the host on the ES is reachable via the first network device and the second network device based on receiving, from the first network device, a third EVPN AD route that comprises the ESI, wherein the first network device is directly connected to the ES; and
update the entry that was based on the IP route to allow sending traffic to the host via the first device.

16. A non-transitory computer-readable medium having instructions encoded thereon that when executed by control circuitry cause the control circuitry to:
receive, from a first network device, a first ethernet virtual private network (EVPN) auto discovery (AD) route that comprises an ethernet segment (ES) identifier (ESI), wherein the first network device is directly connected to the ES;

receive, from a second network device, a second EVPN AD route that comprises the ESI, wherein the second network device is directly connected to the ES;

create an ESI status flag indicating that a host on the ES is reachable via the first network device and the second network device;

receive a plurality of IP routes from the first network device corresponding to a plurality of multihomed hosts on the ES;

generate, in a forwarding table, an entry based on the plurality of IP routes based on determining that the ESI status flag indicates that the host on the ES is reachable via the first network device or the second network device via an equal-cost multi-path (ECMP) construct;

receive, from the second network device, a withdrawal of the first EVPN AD route;

update the ESI status flag to indicate that the plurality of multihomed hosts on the ES is not reachable via the first network device based on the withdrawal of the first EVPN AD route; and replace the ECMP construct that was based on the plurality of IP routes to enable sending traffic to the plurality of multihomed hosts via the second network device, with a single next hop, without requiring separate withdrawal of advertised routes associated with the first network device.

17. The non-transitory computer-readable medium of claim 16, wherein the control circuitry is further configured to:

receive a plurality of IP routes from the second network device corresponding to a plurality of hosts on the ES;

generate, in a forwarding table, entries based on the IP routes based on determining that the ESI status flag indicates that the plurality of hosts on the ES are reachable via the second network device; and update the entries that were based on the IP routes to prevent sending traffic to the host via the first device.

18. The non-transitory computer-readable medium of claim 16, wherein the control circuitry is further configured to:

receive a first data packet addressed to a MAC address of the host;

retrieve, from the entry associated with the MAC address, a next hop identifier; and forward the first data packet using the next hop identifier.

19. The non-transitory computer-readable medium of claim 16, wherein the first network device and the second network device provide active-active multihoming to the host via the ES.

20. The non-transitory computer-readable medium of claim 16, wherein the withdrawal of the first EVPN AD route occurred in response to the first network device losing connection to the ES.

21. The non-transitory computer-readable medium of claim 16, further configured to receive, from the first network device, a third EVPN AD route that comprises the ESI, wherein the first network device is directly connected to the ES.

22. The non-transitory computer-readable medium of claim 16, wherein the control circuitry is further configured to:

update the ESI status flag to indicate that the host on the ES is reachable via the first network device and the second network device based on receiving, from the first network device, a third EVPN AD route that comprises the ESI, wherein the first network device is directly connected to the ES; and update the entry that was based on the IP route to allow sending traffic to the host via the first device.

23. The non-transitory computer-readable medium of claim 16, wherein the plurality of multihomed hosts comprises a plurality of virtual machines running on a hypervisor.

* * * * *